(12) United States Patent
Constans et al.

(10) Patent No.: US 8,892,275 B2
(45) Date of Patent: Nov. 18, 2014

(54) METHOD AND DEVICE FOR AN OPTIMAL MANAGEMENT OF THE VERTICAL TRAJECTORY OF AN AIRCRAFT

(75) Inventors: Florian Constans, Pibrac (FR); Mickael Lefebvre, Toulouse (FR)

(73) Assignee: Airbus Operations SAS, Toulouse (FR)

( * ) Notice: Subject to any disclaimer, the term of this patent is extended or adjusted under 35 U.S.C. 154(b) by 221 days.

(21) Appl. No.: 13/559,295

(22) Filed: Jul. 26, 2012

(65) Prior Publication Data
US 2013/0030611 A1 Jan. 31, 2013

(30) Foreign Application Priority Data

Jul. 29, 2011 (FR) ...................................... 11 56961

(51) Int. Cl.
| | | |
|---|---|---|
| G05D 1/00 | (2006.01) | |
| G05D 1/08 | (2006.01) | |
| G05D 3/00 | (2006.01) | |
| G05F 7/00 | (2006.01) | |
| G06F 17/00 | (2006.01) | |
| G05D 1/06 | (2006.01) | |
| G08G 5/02 | (2006.01) | |

(52) U.S. Cl.
CPC .............. *G08G 5/025* (2013.01); *G05D 1/0676* (2013.01); *G05D 1/0005* (2013.01)
USPC ........................................ 701/7; 701/4; 701/5

(58) Field of Classification Search
None
See application file for complete search history.

(56) References Cited

U.S. PATENT DOCUMENTS

| | | | | |
|---|---|---|---|---|
| 6,259,380 | B1 * | 7/2001 | Jensen | 340/970 |
| 8,346,412 | B2 * | 1/2013 | Lacaze et al. | 701/18 |
| 2005/0261812 | A1 * | 11/2005 | Artini et al. | 701/16 |
| 2008/0249674 | A1 * | 10/2008 | Constans | 701/14 |
| 2008/0262665 | A1 | 10/2008 | Coulmeau | |
| 2008/0269966 | A1 | 10/2008 | Markiton | |
| 2011/0137495 | A1 | 6/2011 | Sacle | |
| 2012/0022725 | A1 * | 1/2012 | Botargues et al. | 701/10 |
| 2012/0265374 | A1 * | 10/2012 | Yochum | 701/5 |

OTHER PUBLICATIONS

Wesner-Early, Caryn, 13559295 EIC STIC Search, Accessed Apr. 28, 2014.*

* cited by examiner

*Primary Examiner* — Calvin Cheung
*Assistant Examiner* — Krishnan Ramesh
(74) *Attorney, Agent, or Firm* — Dickinson Wright PLLC

(57) ABSTRACT

A method and device optimize the vertical trajectory of an aircraft in flight along a predetermined approach trajectory. The method and device include the use of a calculator, which is structured to predict a predicted stabilization altitude at which the aircraft will reach a setpoint approach speed as a function of the current aircraft parameter values, a theoretical vertical trajectory, and predetermined models of aerodynamic efficiency of the aircraft. A comparator is structured to determine absolute value differences between the predicted stabilization altitude and the setpoint stabilization altitude and to compare the differences against a predetermined altitude threshold. A vertical trajectory determination unit is structured to determine an optimized vertical trajectory as a function of the current aircraft parameter values, auxiliary parameter values corresponding to a final approach axis, and the absolute value differences between the predicted stabilization altitude and the setpoint stabilization altitude.

15 Claims, 2 Drawing Sheets

METHOD AND DEVICE FOR AN OPTIMAL MANAGEMENT OF THE VERTICAL TRAJECTORY OF AN AIRCRAFT

FIELD OF INVENTION

The present invention relates to an optimized management method and device for the vertical trajectory of an aircraft, upon a flight along a predetermined approach trajectory, so as to provide a stabilized final approach starting from a setpoint stabilization altitude.

BACKGROUND OF INVENTION

It is known that, prior to the landing on a runway, an airplane must follow an approach trajectory that ends by a stabilized final approach. On such approach trajectory, the airplane decelerates (minimum engine thrust) to reach a setpoint approach speed at a stabilization point. During the approach, the pilot controls the different aerodynamic configurations, as well as the extension of the landing gear. The ideal case is the one when the airplane reaches at the stabilization point with a speed being substantially close of the setpoint approach speed and in a landing configuration. Upon such stabilized final approach, the airplane in a landing configuration follows a final approach axis (also denoted "glide") with a slope with respect to the ground being predefined (generally −3°), with the setpoint approach speed, an adjustment of the engine speed to maintain said approach speed and a stabilized trim from a setpoint stabilization altitude (associated with said stabilization point), for example, equal to 1000 feet (about 300 meters).

However, it may occur that the final approach is a non stabilized approach due to too a short distance to the runway to dissipate the energy, thereby preventing to join the stabilisation altitude in stabilized flight conditions (case of over-energy) or due to a quick loss of energy (case of under-energy) or still from events external to the aircraft, leading to approach trouble.

Moreover, it is known that there are presently different actions allowing the airplane to be restored on a stabilized approach in the case when an over- or under-energy state of the latter is detected.

In particular, in the case of a non detection of an under-energy state of the airplane, i.e. when the fineness of the airplane is too much downgraded (aerodynamic configurations being established too soon, front wind, weak speed and the airplane far from the runway, etc.), the airplane will follow the approach trajectory with a reduction of its speed so that the setpoint approach speed will be reached well before the stabilization point (located on the final approach axis at the stabilization altitude, for example at 3 nautical miles from the runway threshold for a final approach axis of −3 degrees).

The word "fineness" of the airplane means the aerodynamic efficiency of the airplane. So, the total energy variation of the airplane depends on the fineness and on the thrust of the airplane engines.

In such a situation, the under-energy state is only detected lately and the pilots use the engines sooner (in comparison to the ideal case) to maintain the setpoint approach speed up to the stabilization point, and then until the runway threshold.

However, a later detection of an under-energy state leads to a necessary use of the engines, thereby causing:
an extra fuel consumption;
engine wear and tear; and
noise in the cabin and at the level of the ground.

When the under-energy state is detected sufficiently soon with the help of a prediction device for the energy state of the airplane, the pilots can decide to maintain the current speed by using the engines, thru an increase of the engine rating. The fineness of the airplane will then not be downgraded so much. Once the pilots consider as necessary to reposition the engines at the idle speed, the airplane can continue its deceleration so as to reach the approach speed at the stabilization point.

However, even in this last case, an anticipated use of the engines leads to:
an extra fuel consumption;
engine wear and tear; and
noise in the cabin and at the level of the ground (although the latter is reduced with respect to the preceding case, as the airplane is higher).

Furthermore, in the case of a detection of an over-energy state of the airplane, i.e. when the fineness of the airplane is not enough downgraded (aerodynamic configurations not yet established, rear wind, too rapid airplane and too close to the runway, etc.), the airplane will follow the approach trajectory with a reduction of its speed such that the approach speed will be reached well before the stabilization point.

In such situation, the over-energy state is only detected later and the pilots use the airbrakes so as to increase the speed reduction capacities up to the runway threshold.

However, a later detection of the over-energy state leads to a necessary use of the airbrakes, thereby leading to:
the non respect in certain cases of the approach stabilization procedure;
possibly a cancellation of the approach, being followed by a go-around;
noise in the cabin and at the level of the ground; and
discomfort for the passengers.

When the over-energy state is detected soon enough with the help of a prediction device for the energy state of the airplane, the pilots can decide to extend anticipatively:
either the airbrakes to downgrade more the fineness of the airplane. Once the pilots consider as necessary to retract the airbrakes, the airplane can continue its deceleration so as to reach the setpoint approach speed at the stabilization point;
or the slat and flap configurations so as to downgrade the fineness of the airplane more. The airplane will then decelerate more up to the setpoint approach speed at the stabilization point;
or the landing gear to downgrade more the fineness of the airplane. The airplane will then decelerate more up to the setpoint approach speed at the stabilisation point.

However, an anticipated use of the airbrakes, the slat and flap configurations or the landing gear will cause noise in the cabin and at the level of the ground and possibly discomfort for the passengers.

In short, the use of the different above-mentioned means (engines, airbrakes, slat and flap configuration, landing gear) to restore a stabilized approach can generate:
an extra fuel consumption;
engine wear and tear;
noise in the cabin;
noise at the level of the ground;
discomfort for the passengers.

SUMMARY OF INVENTION

An object of the present invention is to remedy such drawbacks and especially to guide the airplane so that it carries out a stabilized approach, i.e. so that the airplane arrives at a point of the approach trajectory with an approach speed in a landing configuration and with a motive speed maintaining the approach speed.

The present invention also aims at restoring a stabilized approach starting from an over- or under-energy state being detected by an improvement of the energy management of the airplane.

With this end in view, according to the invention, the optimized management method for the vertical trajectory of an aircraft upon a flight along a predetermined approach trajectory with which a theoretical vertical trajectory is associated so as to provide a stabilized final approach defined by a setpoint approach speed and a setpoint stabilization altitude on said predetermined approach trajectory, is remarkable in that, during a flight of the aircraft along said predetermined approach trajectory, the following successive steps are carried out automatically, consisting in:

A/ determining the current values of parameters of the aircraft;

B/ predicting by calculation the stabilization altitude at which the aircraft will reach said approach speed as a function of the determined current values of at least some of the parameters of the aircraft, the theoretical vertical trajectory and predetermined models;

C/ comparing the predicted stabilization altitude to the setpoint stabilization altitude;

D/ when the difference between the predicted stabilization altitude and the setpoint stabilization altitude is in an absolute value higher than a predefined altitude threshold, providing an optimized vertical trajectory as a function of the determined current values of at least some of the parameters of the aircraft, of the auxiliary parameter values and of the difference between the predicted stabilization altitude and the setpoint stabilization altitude determined upon the step C/; and E/ transmitting said optimized vertical trajectory to guiding means embedded aboard the aircraft.

Thus, thanks to the invention, the vertical trajectory of the airplane that the latter will be able to flight is optimized upon the approach phase so as to restore a stabilized approach in the case of a detection of an over-energy state (when the difference between the predicted stabilization altitude and the setpoint stabilization altitude is negative and, in an absolute value, higher than said altitude threshold) or an under-energy state (when the difference between the predicted stabilization altitude and the setpoint stabilization altitude is positive and higher than said altitude threshold). In other words, the invention allows the airplane to reach a stabilization point (with which the stabilization altitude is associated) of the approach trajectory, with the setpoint approach speed in a landing configuration and with a motive speed maintaining said setpoint approach speed.

Preferably, as long as the difference between the predicted stabilization altitude and the setpoint stabilization altitude is in an absolute value higher than said altitude threshold, the steps A/, B/, C/ and D/ are iterated, the theoretical vertical trajectory being replaced upon the step B/ by the optimized trajectory being established upon the preceding iteration.

Thus, an iterative process is realized, allowing an adjustment of the vertical trajectory upon the approach phase by successive optimizations so as to make an approach stabilized flight.

In particular, upon the step D/, the current values of the following auxiliary parameters are advantageously used:
an interception point of the final approach axis;
a breaking point of the optimized vertical trajectory being determined upon the preceding iteration of step D/.

Moreover, the optimized vertical trajectory is advantageously comprised between the two following extreme vertical trajectories:
a minimum optimized vertical trajectory that, preferably, comprises:
a slope segment extending from the current point of the airplane on the approach trajectory up to a minimum interception altitude of the final approach axis associated with the approach trajectory;
a level segment extending along said minimum interception altitude up to a minimum interception point; and
a slope segment on the final approach axis extending from the minimum interception point up to a stabilization point,
a maximum optimized vertical trajectory that comprises preferably:
a level segment extending from the current point of the airplane, at constant altitude up to an interception point of the final approach axis; and
a slope segment on the final approach axis extending from said interception point up to the stabilization point.

Moreover, when the optimized vertical trajectory, being established upon the last iteration of step D/, belongs to one of said extreme trajectories, the optimized vertical trajectory transmitted to the guiding means upon step E/ is the optimized vertical trajectory for which the deviation between the associated predicted stabilization altitude and the setpoint stabilization altitude is minimized.

Furthermore, advantageously:
when the difference between the predicted stabilization altitude and the setpoint stabilization altitude is negative and, in an absolute value, higher than said altitude threshold, the airplane is in an over-energy state and the optimized vertical trajectory established upon step D/ tends toward the maximum optimized vertical trajectory;
when the difference between the predicted stabilization altitude and the setpoint stabilization altitude is positive and higher than said altitude threshold, the airplane is in an under-energy state and the optimized vertical trajectory established upon step D/ tends toward the minimum optimized vertical trajectory.

Upon step A/, for example the current values of the following parameters of the aircraft are determined:
a synchronized time;
an air speed of the aircraft;
a ground distance of the aircraft relative to a given point, preferably the runway threshold;
the altitude of the aircraft;
the position of the slats and flaps of the aircraft;
the position of the landing gear;
the position of the airbrakes;
a level of the motive thrust.

Preferably, a sound and/or visual alarm is triggered when the difference between the predicted stabilization altitude and the setpoint stabilization altitude is in an absolute value higher than said altitude threshold.

Moreover, the optimized vertical trajectory being established upon step D/ can be displayed in the cockpit of the airplane.

Furthermore, in a preferred embodiment of the method of the invention, the transmission of the optimized vertical trajectory, upon step E/, to the guiding means of the airplane is triggered by a voluntary action of the pilots.

In addition, said predetermined models can comprise at least some of the following elements:
- a wind model;
- a fineness model;
- an indication of the dynamics of the actuators;
- an indication of operational constraints.

Moreover, the present invention relates to an optimized management device for the vertical trajectory of an aircraft, upon a flight along a predetermined approach trajectory with which a theoretical vertical trajectory is associated so as to provide a stabilized final approach defined by a setpoint approach speed and a setpoint stabilization altitude on said predetermined approach trajectory.

According to the invention, said device comprises:
- means for determining the current values of parameters of the aircraft;
- means for predicting by calculation the stabilization altitude at which the aircraft will reach said approach speed as a function of the determined current values of at least some of the parameters of the aircraft, the theoretical vertical trajectory, and predetermined models;
- means to compare the predicted stabilization altitude to the setpoint stabilization attitude; and
- means to establish an optimized vertical trajectory as a function of the determined current values of at least some of said parameters of the aircraft, the auxiliary parameter values and the difference between the predicted stabilization altitude and the setpoint stabilization altitude being determined by the comparison means, when said determined difference is in an absolute value higher than a predefined altitude threshold.

Moreover, the device can comprise means for emitting a sound and/or visual alarm in the cockpit of the airplane when the difference between the predicted stabilization altitude and the setpoint stabilization altitude, determined by the comparison means, is in an absolute value higher than said altitude threshold.

In addition, said device can comprise display means to present the pilots, on a viewing screen, information relative to the optimized vertical trajectory being established.

The present invention also relates to an airplane comprising a device of the above described type.

BRIEF DESCRIPTION OF THE DRAWINGS

The FIGS. of the accompanying drawing will make well understood how the invention can be realized. On such FIGS. identical annotations denote similar elements.

DETAILED DESCRIPTION OF THE INVENTION

Figure 1:
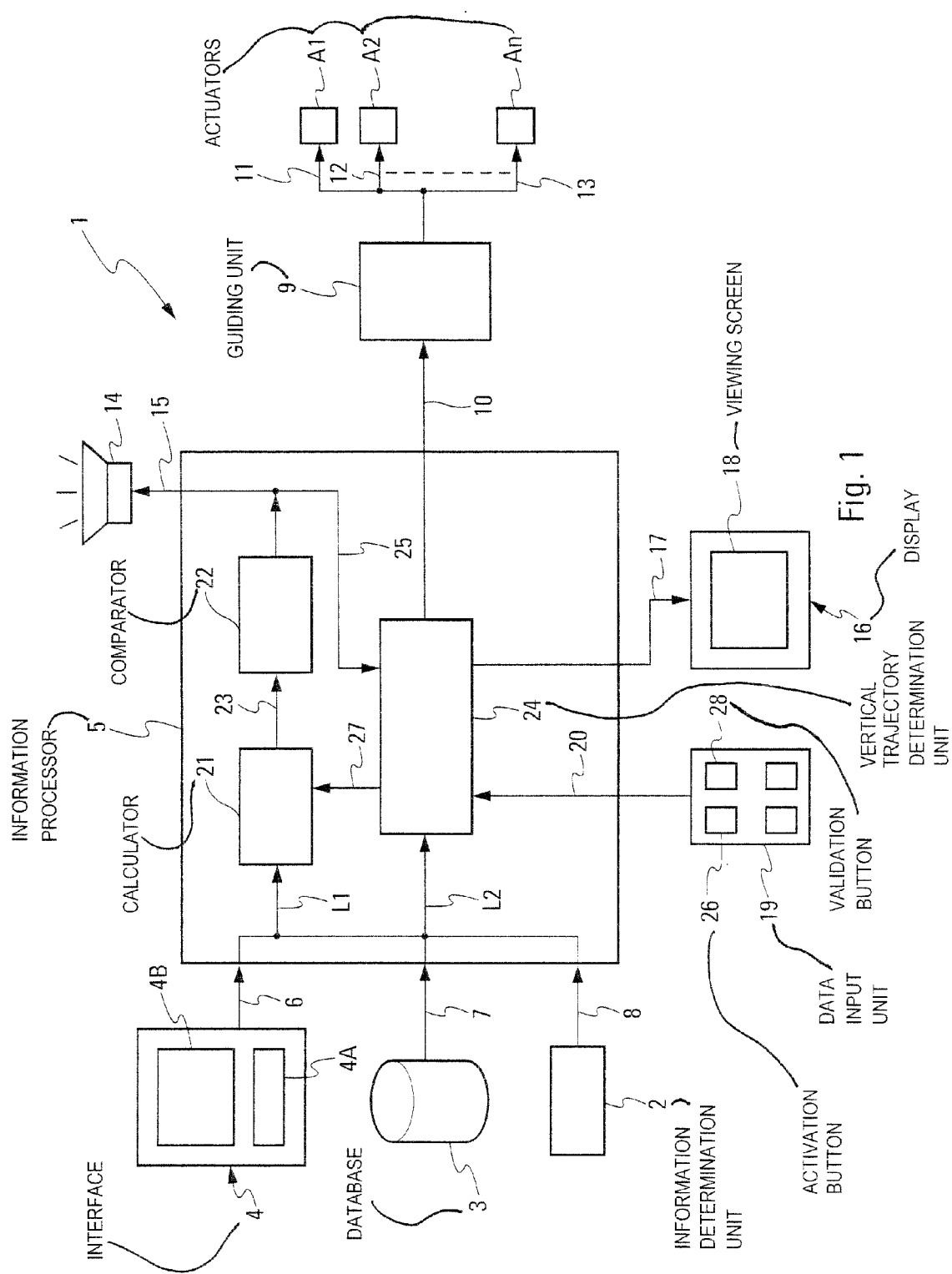
FIG. 1 is the bloc diagram schema of an optimized energy management device for an airplane according to the invention.

On FIG. 1, a device 1 according to the invention is represented for the optimized energy management of an airplane (not represented on this FIG.), upon a flight along a predetermined approach trajectory with which a theoretical vertical trajectory is associated so as to provide a stabilized final approach.

Figure 2:
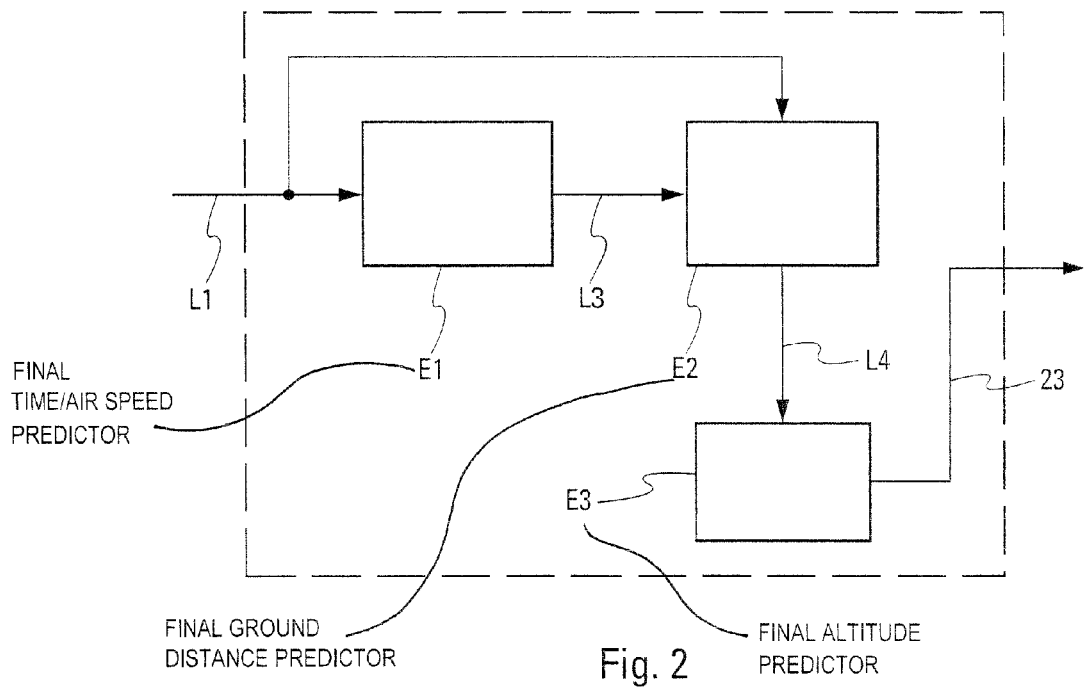
FIG. 2 is a schematic representation of the prediction means of the device of FIG. 1.

As reminded above and as shown on FIG. 2, the approach trajectory is ended by the stabilized final approach, during which the airplane—that is in a landing configuration—follows the final approach axis Ax with a predefined slope with respect to the ground G from a setpoint stabilization altitude Zs, with a setpoint approach speed, an adjustment of the engine speed and a trim being stabilized and predefined.

In the present description, the expression "vertical trajectory" means the airplane trajectory being defined by passing points at different altitudes Z depending on the ground distance X.

As shown on FIG. 1, the device 1 according to the invention comprises:
- a set 2 of usual information sources being detailed below, so as to be able to determine the current values of flight parameters of the airplane;
- at least one data base 3 comprising models as detailed hereinunder;
- interface means 4, in particular a keyboard 4A associated with a display screen 413 or any other usual means to allow the pilots to enter data into the device 1, for example guiding objectives (position, speed and final configurations being desired and targeted);
- one information processing unit 5 being connected, thru links 6 to 8, respectively to the set 2, to the data base 3 and to the interface means 4 and which is formed so as:
  - to predict an over- or under-energy state of the airplane; and
  - to establish an optimized vertical trajectory TO in the case of a detection of such over- or under-energy state;
- guiding means 9 for the airplane, implementing vertical trajectory guiding laws and lateral trajectory guiding laws, so as to keep the airplane respectively on a vertical trajectory and a lateral trajectory being planned. The guiding means 9 are connected thru the link 10 to the processing unit 5 so as to be able to receive an optimized vertical trajectory TO being established by the processing unit 5. Starting from the optimized vertical trajectory TO being received, the guiding means 9 are able to develop command orders at destination of usual actuators A1, A2, . . . , An of the airplane, thru the links 11, 12, . . . , 13 to actuate associated elements (engines, slats, flaps, landing gear, etc.) and provide in such a way the optimized vertical trajectory TO being established.
- means 14 for emitting a sound and/or visual alarm in the cockpit of the airplane, that are connected to the processing unit 5 thru the link 15. When an over- or under-energy state has been detected by the processing unit 5, the means 14 are able to trigger an alarm so as to warn the pilots about such state;
- display means 16 being connected, thru a link 17, to the processing unit 5 and being formed so as to present the pilots of the airplane, on a viewing screen 18 of the cockpit, information relative to the implementation of the invention and, especially, information relative to the optimized vertical trajectory TO established by the processing unit 5 so as to give the pilots the possibility to make acquaintance of the characteristics of the latter; and
- data input means 19, connected to the processing unit 5 thru the link 20, with which the pilots are able to transmit directly information and/or command orders to the processing unit 5, as detailed below.

In the scope of the present invention, said set 2 of information sources can for example comprise:
- an air data calculator of the ADC ("Air Data Computer") type;
- at least an inertial reference system of the IRS ("Inertial Reference System") type; and a flight management system of the FMS ("Flight Management System") type. It will be noticed that the guiding means 9 can be integrated into the FMS.

Thus, the means 2 are adapted to transmit via the link 8 to the processing unit 5:
the current values of the following parameters:
   the time (that is synchronized with the device 1);
   the air speed of the plane;
   the ground distance X of the airplane with respect to a given point, preferably the runway threshold;
   the altitude of the airplane;
   the position of the slats and flaps (i.e. the aerodynamic configuration of the airplane);
   the position of the landing gear;
   a position of the airbrakes;
   a motive thrust level;
the lateral trajectory defined by passing points, being associated with the predetermined approach trajectory; and
the theoretical vertical trajectory associated with the predetermined approach trajectory.

As previously indicated, the processing unit 5 can also receive via the link 6 guiding objectives.

Moreover, the data base 3 can supply thru the link 7 different pieces of information to the processing unit 5, especially as follows:
   a wind model. In order to make the prediction precise, probable wind information is used throughout the trajectory. For this purpose, it is possible to use the same wind model than the flight management system FMS of the airplane.
   a dynamics of the actuators. In order to make the prediction precise, dynamics of different actuators are used (particularly the extension time for the slats and flaps and for the landing gear);
   speed constraints. To be sure that the device 1 can take the operational constraints into account, the minimum and maximum operational speeds are supplied; and
   fineness models. In order to make the prediction possible, different fineness models are used for the airplane, preferably a model for each aerodynamic configuration with or without landing gear being extended.

Moreover, as shown on FIG. 1, the processing unit 5 comprises:
   means 21 to predict by calculation the stabilization altitude at which the airplane will reach the setpoint approach speed from information (especially the current values of parameters, the theoretical vertical trajectory and predetermined models) received thru a link L1 (grouping the above mentioned links 6, 7 and 9 together). For this, the means 21 make progressive calculations for a plurality of successive segments along the trajectory of the airplane up to the stabilization point. Each segment corresponds to a constant aerodynamic configuration phase with or without landing gear being extended of to a transient phase of aerodynamic configurations or of extension of the landing gear, of the parameters predicted at the end of any segment being used as initial parameters for the segment following directly. Thus, the prediction implemented by the prediction means 21 occurs by propagation of the calculation from one segment to another. Two distinctions are thus to be taken into account:
      the case of a segment with a constant aerodynamic configuration; and
      the case of a segment upon a transient of aerodynamic configurations.

Since upon the approach phase, the pilots must control the different aerodynamic configurations, namely the slats and flaps and the position of the landing gear, and hypothesis is taken within the prediction that such different configurations and positions are extended according to the standard procedure (i.e. depending on the standard characteristic speeds). However, it could be envisaged that those characteristic speeds are different from the standard characteristic speeds;
   means 22 for comparing the predicted stabilization altitude—received from the prediction means 21 by the link 23—with the setpoint stabilization altitude Zs. The comparison means 22 are adapted to calculate the differences between the predicted stabilisation altitude and the setpoint stabilisation altitude Zs and to compare the absolute value of the difference with a predetermined altitude threshold. The three following cases can then occur:
      the calculated difference is lower than the altitude threshold, the airplane is in a nominal energy situation;
      the calculated difference is negative and is in an absolute value higher than said altitude threshold, the airplane is in an over-energy state;
      the calculated difference is positive and is higher that said altitude threshold, the airplane is in an under-energy state.

In the case of detection of an over- or under-energy state by the means 22, a signal comprising information related to the detection can be emitted by the means 22 and received by the emitting means 14 (link 15) which, in response, trigger the emission of an alarm to warn the pilots about such energy state; and
   means 24 to establish an optimized vertical trajectory TO, which are connected thru links L2 (grouping the above mentioned links 6, 7 and 8 together), 20 and 25, respectively to the means 2, 3 and 4, to the data input means 19 and to the comparison means 22.

As shown on FIG. 2, the prediction means 21 for the stabilization altitude comprise:
   one element E1 making a prediction:
      either—in the case of a segment with a constant aerodynamic configuration—of the final time where the airplane will reach a final air speed, from the initial air speed, the final airspeed and the initial time received by the link L1;
      or—in the case of a segment upon a transient of aerodynamic configurations of the airplane—of the final air speed on said segment, as the segment time is known (extension time of the configuration), from the initial air speed and the time deviation of said segment being received by the link L1.

The element E1 is thus able to deliver at the output, thru the link L3, a prediction of the final time or the final air speed on the segment being considered;
   one element E2 performing a prediction of the ground distance at the end of the segment being considered, with the help of the initial and final air speeds, the time deviation between the final and the initial time of the segment being considered as well as the initial ground distance of the segment being considered (received via the links L1 and L3). The element E2 is adapted to deliver at the output, thru the link L4, the final ground distance associated with the segment being considered; and
   one element E3 performing a final altitude prediction on the segment being considered, from said final ground distance (received by the link L4) by taking a table into account. Such table represents the vertical trajectory being planned to be flied. The planned trajectories are frequently simple and can be defined by a succession of segments. It is then possible to represent these trajectories by passing points (or interpolation points) coming from said table. The interpolation of all these points allows the overall behavior of the trajectory to be represented. It is then possible, from one point in the ground marker (final predicted ground distance) to calculate the final altitude associated with said point in the ground marker. This table can evolve in the case where the vertical trajectory is supposed to be modified.

As shown on FIG. 3, to be in agreement with the air control, each optimized vertical trajectory TO being established by the means 24 is comprised between the two extreme vertical trajectories TOmin and TOmax as follows:
- a minimum optimized vertical trajectory TOmin, comprising:
  - a slope segment S1 extending from the current point {Xa,Za} of the airplane on the approach trajectory until the minimum interception altitude Zmin of the final approach axis Ax. Zmin can be configured by the pilot thru the interface means 4;
  - a level segment S2 extending along said minimum interception altitude Zmin up to the minimum interception point {Xmin,Zmin}; and
  - a slope segment S3 on the final approach axis Ax extending from the minimum interception point {Xmin, Zmin} until the stabilization point {Xs,Zs}, Zs being the setpoint stabilization altitude;
- a maximum optimized vertical trajectory TOmax comprising:
  - a level segment S4 extending from the current point {Xa,Za} of the airplane, at constant altitude Za, until an interception point {Xi,Zi} of the final approach axis Ax; and
  - a slope segment S5 on the final approach axis Ax extending from the interception point {Xi,Zi} until the stabilization point (Xs,Zs).

Alternatively, the minimum optimized vertical trajectory could be defined by a maximum descent slope, or a maximum vertical descent speed, and the maximum optimized vertical trajectory could be defined by a minimum descent slope, or a minimum vertical descent speed.

The logic of the means 24 to establish an optimized vertical trajectory TO rests on the following considerations:
in the case of an over-energy state being detected, the means 24 will build optimized vertical trajectories TO favoring the levels starting from the current position {Xz,Za} of the airplane. Indeed, the fineness of the airplane can be translated as a capacity in terms of total slope. The total slope $\gamma_T^{A/C}$ is defined by two parameters, namely the acceleration $\dot{V}$ of the airplane on the trajectory (V being the speed of the aircraft) and the slope $\gamma$ of the trajectory, as illustrated by the following equation:

$$\gamma_T^{A/C} = \frac{\dot{V}}{g} + \gamma$$

wherein g is the gravitational acceleration of the earth. Thus, in the case where the airplane flies at constant altitude (i.e. it is on a level), the slope is nil ($\gamma=0$), so that the whole fineness of the airplane is used with the term of acceleration. Since the total slope is negative in an approach phase (the engines are at idle speed), the airplane will decelerate at the maximum of its capacities. By quickly decelerating, the airplane will reduce its speed rapidly, which allows in a first time energy to be dissipated. Moreover, as the airplane reaches small speeds rapidly (and thus the characteristic configuration modification speeds) the different configurations of the slats, the flaps and the landing gear will be able to be controlled sooner so as to downgrade more the airplane fineness. Thus, these two effects due to the vertical trajectory modification will allow the airplane to restore an energy situation being advantageous for the stabilization; and in the case of an under-energy state being detected, the means 24 will build optimized vertical trajectories TO favoring the slopes from the current position {Xz,Za} of the airplane. Indeed, steeper the slope and smaller the acceleration term and thus less deceleration for the airplane. In a first extreme case for which the slope of the trajectory is equal to the total slope, the airplane flies at constant speed. In a second extreme case for which the slope is lower (negative) than the total slope (also negative), the acceleration term then becomes positive and the airplane speed increases. Thus, in the case of an under-energy, the modification of the vertical trajectory by favoring the slopes will allow the airplane to decelerate less and thus to limit the degradation of its fineness. Both those effects due to the modification of the vertical trajectory will allow the airplane to restore an energy situation being advantageous to the stabilization. In other words, by avoiding any deceleration too soon thanks to the slope, it is avoided to change the configurations of the slats, the flaps and the landing gear too soon, thereby enabling to avoid to reach total strong slopes too rapidly and thus to decelerate too soon. This allows minimizing the energy loss in the case of an under-energy situation.

In a preferred embodiment of the invention, the means 24 can be activated by the pilots, for example with a voluntary action on an activation/inactivation button 26 belonging to the data input means 19. With no activation of the means 24 by the pilots, no optimized vertical trajectory TO is established. Obviously, alternatively, such activation/inactivation could be optional.

When they receive (link 25) the signal comprising information relative to the detection of an over- or under-energy state supplied by the comparison means 22, the means 24—after previously activated by the pilots—are adapted to establish an optimized vertical trajectory TO from information coming from the means 2, 3 and 4 and 22. Then, they transmit to the prediction means 21 (link 27) information relative to the optimized vertical trajectory TO being established.

When the prediction means 21 receive information relative to the optimized vertical trajectory TO, they calculate the stabilization altitude—that is associated with this optimized vertical trajectory TO—at which the airplane will reach the setpoint approach speed.

The so-predicted stabilization altitude is then transmitted to the comparison means 22 (link 23) adapted to compare it to the setpoint stabilization altitude Zs.

When the difference between the predicted stabilization altitude and the setpoint stabilization altitude Zs is in an absolute value lower than the altitude threshold, the information relative to the optimized vertical trajectory TO being established is sent to the display means 16 thru the link 17, adapted to display the optimized vertical trajectory TO being established for a validation. The pilots can then:
either validate the optimized vertical trajectory TO displayed on the means 16 by actuating a validation button 28 for the data input means 19. In this case, the optimized vertical trajectory TO being established is transmitted to the guiding means 9 thru the link 10;

or refuse the optimized vertical trajectory TO displayed on the means 16. Such a refuse is for example obtained by an absence of action on the data input means 19. The optimized vertical trajectory TO is not, in this last case, transmitted to the guiding means 9.

When the difference between the predicted stabilization altitude and the set point stabilization altitude Zs is in an absolute value higher than the altitude threshold, a new optimized trajectory TO is established by the means 24. Information relative to this new optimized vertical trajectory TO being established is then transmitted to the prediction means 21 that, again, calculate the associated stabilisation altitude at which the airplane will reach the setpoint approach speed. The so-predicted stabilization altitude is then transmitted to the comparison means 22 (link 23) adapted to compare it to the setpoint stabilization altitude Zs.

When the difference between the predicted stabilization altitude and the setpoint stabilization altitude Zs is in an absolute value lower than the altitude threshold, the information relative to the optimized vertical trajectory being established is sent to the display means 16 thru the link 17, adapted to display the optimized vertical trajectory TO being established for a validation.

When the difference between the predicted stabilization altitude and the setpoint stabilization altitude Zs is in an absolute value higher than the altitude threshold, the preceding operations for the establishment of an optimized vertical trajectory, the prediction and the comparison as long as the difference between the associated predicted stabilization altitude and the setpoint stabilization altitude Zs stays, in an absolute value, higher than said altitude threshold are successively iterated.

The determination of an optimized vertical trajectory TO by the means 24 can be done on the detailed way hereinafter.

The optimized vertical trajectory TO, starting from a current point $\{Xa,Za\}$ of the airplane, joins the final approach axis Ax at the interception point $\{Xmin,Zmin\}$, Zmin being the minimum interception altitude.

Moreover, the optimized vertical trajectory TO comprises two segments, namely:
- a first segment extending from the current position of the airplane $\{Xa,Za\}$ up to a breaking point $\{Xc,Zc\}$; and
- a second segment extending from the breaking point $\{Xc,Zc\}$ up to the interception point $\{xmin,Zmin\}$ of the final approach axis.

The breaking point then defines the separation between the two segments of an optimized vertical trajectory. The structure of the latter is thus done essentially by this breaking point $\{Xc,Zc\}$.

Figure 3:
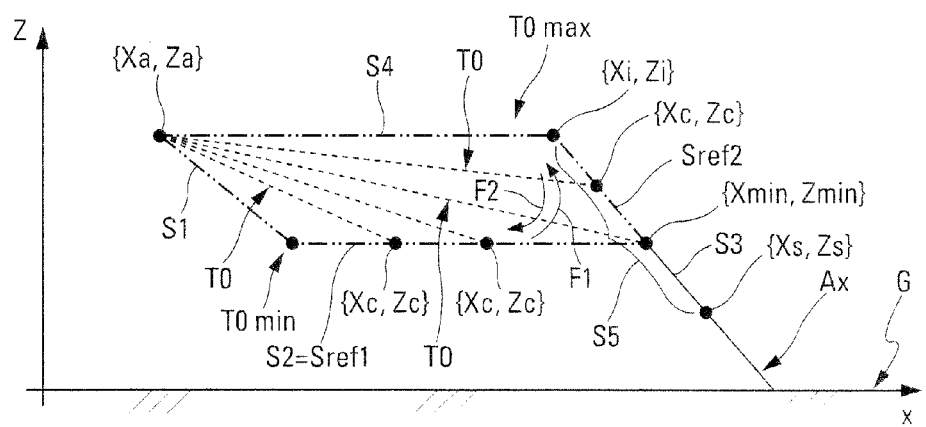
FIG. 3 illustrates examples of optimized vertical trajectories established by the device of FIG. 1.

As shown on FIG. 3, the breaking point $\{Xc,Zc\}$ can evolve on two reference segments Sref1 and Sref2 upon the above mentioned successive iterations:
- the first reference segment Sref1 is a level segment defined at the minimum interception altitude Zmin. It corresponds to the segment S2 of the optimized minimum vertical trajectory TOmin; and
- the second reference segment Sref2 is a slope segment belonging to the final approach axis Ax and extending between the interception point $\{Xi,Zi\}$ and the minimum interception point $\{Xmin,Zmin\}$.

Upon successive iterations, the breaking point $\{Xc,Zc\}$ is modified by the means 24 so as to establish new optimized vertical trajectories. Two distinct cases are to be taken into account:

first case (case of under-energy): starting from a given breaking point at the preceding iteration, denoted k, when the difference being determined by the means 22 between the predicted stabilization altitude and the setpoint stabilization altitude (Zs) is negative and is in an absolute value higher than said altitude threshold, the airplane is in an over-energy state so that the means 24 modify the coordinates of the breaking point upon the following iteration, denoted k+1, according to the direction of the arrow F1 (FIG. 3). In this first case, the modification of the coordinates of the breaking point $\{Xc,Zc\}$ first occurs by a given ground distance increment X to be closer from the minimum interception point $\{Xmin,Zmin\}$ when said breaking point is on the level segment Sref1, then by a given altitude increment, when said breaking point is on the slope segment Sref2 going up to the minimum interception point $\{xmin,Zmin\}$; and second case (case of over-energy): starting from a given breaking point at the preceding iteration k, when the difference between the predicted stabilization altitude and the setpoint stabilization altitude Zs is positive and higher than said altitude threshold, the airplane is in an under-energy state so that the means 24 modify the coordinates of the breaking point upon the following iteration k+1 according to the direction of the arrow F2 (FIG. 3). In this second case, the modification of the coordinates of the breaking point $\{Xc,Zc\}$ occurs by a given altitude increment going down to the minimum interception point $\{Xmin,Zmin\}$ when said point is on the slope segment Sref2, then by a given ground distance increment going away from the minimum interception point $\{Xmin,Zmin\}$ when said point is on the level segment Sref1.

Thus, it can be deducted from the implementation of successive iterations both following distinct cases:

first case: the prediction means predict a stabilization of the airplane at the setpoint stabilization altitude Zs so that the iterations stop. The last optimized vertical trajectory TO being established is the so-called optimal one and is transmitted, after validation by the pilots, to the guiding means 9;

second case: it is no longer possible to establish a new optimized vertical trajectory, as the optimized vertical trajectory TO established upon the last iteration is located on one of the extreme vertical trajectories TOmin or TOmax. The optimized vertical trajectory TO being transmitted to the guiding means 9, after validation by the pilots, is then the one for which the deviation between the associated predicted stabilization altitude and the setpoint stabilization altitude Zs is minimized.

So, the present invention allows the prediction of the energy state of the airplane in real time throughout the planned approach trajectory and the proposal of a new optimized vertical trajectory TO enabling a stabilized flight in approach.

In other words, thanks to the invention, an adjustment of the vertical trajectory of the approach phase is performed so as to improve the energy management and thus to enable in such a way an energy meeting in approach.

The invention claimed is:

1. A method for optimizing vertical trajectory of an aircraft in flight along a predetermined approach trajectory to provide a stabilized final approach defined by a setpoint approach speed and a setpoint stabilization altitude (Zs) on said predetermined approach trajectory, said method comprising the steps of:

A/ determining, by an information determination unit, current aircraft parameter values, including a theoretical vertical trajectory for the predetermined approach trajectory;

B/ predicting, by a calculator, a predicted stabilization altitude at which the aircraft will reach said setpoint approach speed as a function of:
  i) the current aircraft parameter values determined by the information determination unit,
  ii) the theoretical vertical trajectory determined by the information determination unit, and
  iii) predetermined models of aerodynamic efficiency of the aircraft, received from a database;

C/ calculating, by a comparator, absolute value differences between the predicted stabilization altitude and the setpoint stabilization altitude (Zs) and comparing, by the comparator, the calculated absolute value differences with a predetermined altitude threshold;

D/ determining, by a vertical trajectory determination unit, an optimized vertical trajectory (TO) as a function of:
  i) the current aircraft parameter values determined by the information determination unit,
  ii) auxiliary parameter values of parameters corresponding to a final approach axis for the predetermined approach trajectory, and
  iii) the absolute value differences between the predicted stabilization altitude and the setpoint stabilization altitude (Zs) determined by the comparator of step C, wherein the optimized vertical trajectory (TO) is determined at a condition in which the comparison operation determines that an absolute value difference between the predicted stabilization altitude and the setpoint stabilization altitude (Zs) is higher than the predefined altitude threshold; and E/ transmitting said optimized vertical trajectory (TO) to a guiding unit structured to guide the aircraft.

2. The method according to claim 1,
wherein, the steps A/, B/, C/ and D are repeated as iterative steps, with the theoretical vertical trajectory being replaced by the optimized trajectory (TO) at each iterative step B/.

3. The method according to claim 2,
wherein, the auxiliary parameters are comprised of:
an interception point on the final approach axis (Ax); and
a breaking point along the optimized vertical trajectory (TO), wherein the breaking point is determined at each iterative step D/.

4. The method according to claim 1,
wherein the optimized vertical trajectory (TO) is determined as being between a minimum optimized vertical trajectory (TOmin) and a maximum optimized vertical trajectory (TOmin), wherein:
the minimum optimized vertical trajectory (TOmin) comprises:
  a slope segment (S1) extending from a current point $\{Xa,Za\}$ of the airplane on the predetermined approach trajectory up to a minimum interception altitude (Zmin) of the final approach axis (Ax) for the predetermined approach trajectory;
  a level segment (S2) extending along said minimum interception altitude (Zmin) up to a minimum interception point $\{Xmin,Zmin\}$; and
  a slope segment (S3) on the final approach axis (Ax) extending from the minimum interception point ($\{Xmin,Zmin\}$) up to a stabilization point ($\{Xs,Zs\}$),
the maximum optimized vertical trajectory (TOmax) comprises:
  a level segment (S4) extending from the current point ($\{Xa,Za\}$) of the airplane, at constant altitude (Za) up to an interception point ($\{Xi,Zi\}$) of the final approach axis (Ax); and
  a slope segment (S5) on the final approach axis (Ax) extending from said interception point ($\{Xi,Zi\}$) up to the stabilization point ($\{Xs,Zs\}$).

5. The method according to claim 4,
wherein, the steps A/, B/, C/ and D are repeated as iterative steps, and the optimized vertical trajectory (TO) transmitted to the guiding unit in the step E/ is the optimized vertical trajectory (TO) for which deviation between the predicted stabilization altitude and the setpoint stabilization altitude (Zs) is minimized.

6. The method according to claim 4,
wherein, at a condition in which the difference between the predicted stabilization altitude and the setpoint stabilization altitude (Zs) is negative and the absolute value difference is higher than said altitude threshold, the aircraft is in an over-energy state and the optimized vertical trajectory (TO) tends toward the maximum optimized vertical trajectory (TOmax).

7. The method according to claim 4,
wherein, at a condition in which the difference between the predicted stabilization altitude and the setpoint stabilization altitude (Zs) is positive and the absolute value difference is higher than said altitude threshold, the aircraft is in an under-energy state and the optimized vertical trajectory (TO) tends toward the minimum optimized vertical trajectory (TOmin).

8. The method according to claim 1,
wherein, the current aircraft parameter values are comprised of the following parameters:
a synchronized time;
an air speed of the aircraft;
a ground distance (X) of the aircraft relative to a given point;
altitude (Za) of the aircraft;
positions of the slats and flaps of the aircraft;
position of the landing gear;
a position of the airbrakes;
a level of the motive thrust.

9. The method according to claim 1,
wherein a sound or visual alarm is triggered at a condition in which the absolute value difference between the predicted stabilization altitude and the setpoint stabilization altitude (Zs) is higher than said altitude threshold.

10. The method according to claim 1,
wherein the transmission of the optimized vertical trajectory (TO) to the guiding unit is triggered by a voluntary action of the pilots.

11. The method according to claim 1,
wherein said predetermined models received by the calculator include at least one of the following elements:
a wind model;
a fineness model;
an indication of actuator dynamics; and
an indication of operational constraints.

12. A vertical trajectory management device for optimizing the vertical trajectory of an aircraft in flight along a predetermined approach trajectory to provide a stabilized final approach defined by a setpoint approach speed and a setpoint stabilization altitude (Zs) on said predetermined approach trajectory, said vertical trajectory management device comprising:

an information determination unit structured to determine current aircraft parameter values, including a theoretical vertical trajectory for the predetermined approach trajectory;
a database structured to supply information based on predetermined models of aerodynamic efficiency of the aircraft;
a calculator structured to calculate a predicted stabilization altitude at which the aircraft will reach said setpoint approach speed, wherein the calculator is structured to calculate the predicted stabilization altitude as a function of:
   i) the current aircraft parameter values received from the information determination unit,
   ii) the theoretical vertical trajectory received from the information determination unit, and
   iii) the predetermined models of aerodynamic efficiency of the aircraft received from the database;
a comparator structured to calculate absolute value differences between the predicted stabilization altitude, predicted by the calculator, and the setpoint stabilization altitude (Zs), and to compare the calculated absolute value differences with a predetermined altitude threshold;
a vertical trajectory determination unit structured to determine an optimized vertical trajectory (TO) as a function of:
   i) the current aircraft parameter values received from the information determination unit,
   ii) auxiliary parameter values of parameters corresponding to a final approach axis for the predetermined approach trajectory and
   iii) the absolute value differences between the predicted stabilization altitude and the setpoint stabilization altitude (Zs) determined by the comparator,
wherein the vertical trajectory determination unit is structured to determine the optimized vertical trajectory (TO) at a condition in which said comparator determines that an absolute value difference between the predicted stabilization altitude and the setpoint stabilization altitude (Zs) is higher than the predefined altitude threshold; and
a guiding unit structured to guide the aircraft based on the optimized vertical trajectory (TO) determined by the vertical trajectory determination unit.

13. The device according to claim 12,
further comprising an alarm structured to transmit a sound alarm or a visual alarm to a cockpit of the aircraft at a condition in which the comparator determines that an absolute value difference between the predicted stabilization altitude and the setpoint stabilization altitude (Zs) is in an absolute value higher than said altitude threshold.

14. The device according to claim 12,
further comprising a display unit structured to display, on a viewing screen, information relative to the optimized vertical trajectory (TO) being established determined by the vertical trajectory determination unit.

15. An aircraft, comprising:
a vertical trajectory management device for optimizing the vertical trajectory of an aircraft inflight along a predetermined approach trajectory to provide a stabilized final approach defined by a setpoint approach speed and a setpoint stabilization altitude (Zs) on said predetermined approach trajectory, said vertical trajectory management device comprising:
an information determination unit structured to determine current aircraft parameter values, including a theoretical vertical trajectory for the predetermined approach trajectory;
a database structured to supply information based on predetermined models of aerodynamic efficiency of the aircraft;
a calculator structured to calculate a predicted stabilization altitude at which the aircraft will reach said setpoint approach speed, wherein the calculator is structured to calculate the predicted stabilization altitude as a function of:
   i) the current aircraft parameter values received from the information determination unit,
   ii) the theoretical vertical trajectory received from the information determination unit, and
      iii) the predetermined models of aerodynamic efficiency of the aircraft received from the database;
a comparator structured to calculate absolute value differences between the predicted stabilization altitude, predicted by the calculator, and the setpoint stabilization altitude (Zs), and to compare the calculated absolute value differences with a predetermined altitude threshold;
a vertical trajectory determination unit structured to determine an optimized vertical trajectory (TO) as a function of:
   i) the current aircraft parameter values received from the information determination unit,
   ii) auxiliary parameter values of parameters corresponding to a final approach axis for the predetermined approach trajectory and
   iii) the absolute value differences between the predicted stabilization altitude and the setpoint stabilization altitude (Zs) determined by the comparator,
wherein the vertical trajectory determination unit is structured to determine the optimized vertical trajectory (TO) at a condition in which said comparator determines that an absolute value difference between the predicted stabilization altitude and the setpoint stabilization altitude (Zs) is higher than the predefined altitude threshold; and
a guiding unit structure to guide the aircraft based on the optimized vertical trajectory (TO) determined by the vertical trajectory determination unit.

* * * * *